(12) United States Patent
Mushika et al.

(10) Patent No.: US 6,369,973 B1
(45) Date of Patent: Apr. 9, 2002

(54) DISK DEVICE WITH TEMPERATURE CALCULATION SECTION FOR CALCULATING TEMPERATURE CHANGE AND DIFFERENCE

(75) Inventors: Yoshihiro Mushika, Neyagawa; Yasuo Nishihara; Kenji Takauchi, both of Katano, all of (JP)

(73) Assignee: Matsushita Electric Industrial Co., Ltd, Kadoma (JP)

( * ) Notice: Subject to any disclaimer, the term of this patent is extended or adjusted under 35 U.S.C. 154(b) by 0 days.

(21) Appl. No.: 09/286,146

(22) Filed: Apr. 5, 1999

(30) Foreign Application Priority Data

Apr. 6, 1998 (JP) .......................... 10-093118

(51) Int. Cl.[7] .............................. G11B 5/596
(52) U.S. Cl. ................................. 360/78.07
(58) Field of Search ...................... 360/71, 75, 78.07, 360/25; 318/254; 369/47.38, 47.44, 47.54, 47.14, 13.46, 53.18, 13.51

(56) References Cited

U.S. PATENT DOCUMENTS 5,128,813 A * 7/1992 Lee ..................... 360/78.07
5,204,593 A * 4/1993 Ueki .................... 318/254
5,594,603 A * 1/1997 Mori et al. ............. 360/78.04
5,764,430 A * 6/1998 Ottesen et al. .......... 360/73.03

FOREIGN PATENT DOCUMENTS

JP   06119008 A   4/1994
JP   07153208 A   6/1995

* cited by examiner

*Primary Examiner*—David Hudspeth
*Assistant Examiner*—K. Wong
(74) *Attorney, Agent, or Firm*—Renner, Otto, Boisselle & Sklar, LLP

(57) ABSTRACT

The disk device of this invention includes: a disk driving section for rotating a disk; a head for recording and/or reproducing information on and/or from the disk; a head moving section for moving the head from a start position to a destination position; a temperature calculation section for calculating a temperature change at a predetermined position, wherein the calculation is carried out based on the information of the start position and the destination position; and a control section for controlling the disk driving section and/or the head moving section depending on the temperature change calculated by the temperature calculation section.

30 Claims, 5 Drawing Sheets

DISK DEVICE WITH TEMPERATURE CALCULATION SECTION FOR CALCULATING TEMPERATURE CHANGE AND DIFFERENCE

BACKGROUND OF THE INVENTION

1. Field of the Invention

The present invention relates to a disk device in which a recording head is moved while a disk as a recording medium is rotated so that information is recorded on and/or reproduced from the disk. More particularly, the present invention relates to a disk device having a temperature control mechanism for suppressing a temperature rise.

2. Description of the Related Art

In a disk device of the above type, an operation called a seek, which involves moving a recording head to a predetermined position at high speed, is frequently repeated in some cases. Such a seek consumes an extremely large amount of power when compared with a normal recording and/or reproduction operation which does not include high-speed movement of the head. Accordingly, if seeks are continuously performed for an extended period of time, the temperature inside the disk device becomes high. In the case where the disk is under control by constant angular velocity (CAV), such heating during the seek mainly arises from a motor driving system for moving the head. In the case where the disk is under control by constant linear velocity (CLV), the heating during the seek mainly arises from a motor driving system for driving the disk, in addition to the motor driving system for moving the head.

Due to such a temperature rise caused by the heating of the driving system during the seek, the temperatures of the disk and components of the disk device exceed their respective allowable temperature levels.

Some measures for overcoming the above problem of temperature rise have been proposed. For example, U.S. Pat. No. 5,566,077 discloses a construction in which a temperature sensor is provided inside an optical disk devise for detecting the temperature of the device so as to limit the operation of the device when the temperature of the device exceeds a predetermined temperature level thereby preventing an excessive temperature rise.

A technique has also been proposed in which the temperature at a desired position is predicted by an arithmetic operation. According to this technique, the cost and the number of assembling steps can be reduced since installation of a temperature sensor is not required. Also, the temperature of a position at which direct installation of a temperature sensor is difficult can be obtained. For example, Japanese Laid-Open Publication No. 7-153208 discloses a construction in which temperature rise of a voice coil motor (VCM) for moving a head is predicted by an arithmetic operation based on a current instruction value for the VCM.

FIG. 5 shows an example of a conventional disk device which predicts a temperature rise by an arithmetic operation.

Referring to FIG. 5, a conventional magnetic disk device 101 includes a disk enclosure (DE) 102. The DE 102 includes a disk motor 103, a spindle 104, a voice coil motor (VCM) 106, and a magnetic head 107. A magnetic disk 105 is loaded in the DE 102. The VCM 106 moves the magnetic head 107 in a direction of the radius of the magnetic disk 105 for positioning the magnetic head 107. The magnetic disk device 101 further includes a servo controller 118, which includes a VCM control section 135. The VCM control section 135 includes a temperature detection sub-section 114 for predicting the temperature of the VCM 106, a positioning control sub-section 115, and RAM 122.

The RAM 122 stores data, such as a VCM current instruction value $I_v$, the quantity of heat corresponding to a temperature rise $\Delta Q_{v1}$, the quantity of heat corresponding to spontaneous heat emission $\Delta Q_{v2}$, the quantity of heat of an object to be measured $Q_v$, and the temperature of the object to be measured $T_v$, renewably. The RAM 122 is provided with a soft timer. In addition, ROM (not shown) prey stores data such as a constant K, a constant indicating heat resistance $\theta$, the heat capacity of the object to be measured $C_v$, the environmental temperature $T_a$, the sampling time $t_s$, a constant a, and a constant b.

In the magnetic disk device 101 with the above configuration, the temperature detection sub-section 114 performs a prediction operation of the temperature of the VCM in the following procedure.

The VCM control section 135 interrupts normal seek control every sampling time $t_s$ of 66 μsec, to detect the position of the magnetic head 107 and renew the VCM current instruction value $I_v$. Then, the temperature detection sub-section 114 multiplies the second power of the VCM current instruction value $I_v$ by the coefficients K and $t_s$ to obtain the quantity of heat corresponding to temperature rise of the object to be measured $\Delta Q_{v1}$ ($=I_v^2 \times K \cdot t_s$). A value obtained by subtracting the quantity of heat corresponding to the spontaneous heat emission of the object to be measured $\Delta Q_{v2}$ from the quantity of heat corresponding to temperature rise $\Delta Q_{v1}$ is then integrated ($Q_v \leftarrow Q_v + \Delta Q_{v1} - \Delta Q_{v2}$), so as to obtain the quantity of heat of the object to be measured $Q_v$ and thus detect the temperature of the object to be measured $T_v$ ($T_v = Q_v / C_v$).

The above processing is performed every sampling time $t_s$ and the detected temperature $T_v$ is stored in the RAM 122. During a seek, the temperature $T_v$ is read from the RAM 122 to perform seek control based on the temperature $T_v$.

In the seek control, if the detected temperature $T_v$ is larger than a reference value, the start of the seek is delayed depending on the temperature $T_v$, so that temperature rise is suppressed.

A delay amount D by which the start of the seek is delayed is set as a primary function of the temperature $T_v$ at $D = aT_v - b$ (wherein a and b are constants stored in the ROM). The delay amount D is set depending on the temperature $T_v$ in the following manner: When the reference value for the temperature $T_v$ is $T_1$, the delay amount D is set at 0 if $T_v \leq T_1$ and set at $aT_v - b$ if $T_v > T_1$.

Accordingly, the seek is started upon receipt of a seek instruction if the temperature $T_v$ is less than the reference value $T_1$, or the seek is started only after a delay by the delay amount D which is proportional to the temperature $T_v$ if the temperature $T_v$ exceeds the reference value $T_1$. This suppresses the temperature rise of the VCM and thus prevents an occurrence of overheating and breaking of the VCM.

The above conventional disk device has the following problems.

The first problem is that the amount of the arithmetic operation required for the temperature prediction is large. Accordingly, the control section must bear a large burden. More specifically, for the temperature prediction operation, the control section must perform interruption at a very frequent sampling period of 66 μsec. For each interruption, the control section retrieves the current instruction value $I_v$ and performs calculations for obtaining the quantity of heat $\Delta Q_{v1}$, the quantity of heat radiation $\Delta Q_{v2}$, and the temperature $T_v$. This interruption is required all the time irrespective of whether the device is under the recording operation or the seek operation. Such frequent interruption significantly increases the burden on the control section of the disk device, lowering the processing capability of the control section.

The second problem is as follows. While the temperature of the VCM is controlled so as not to exceed its allowable temperatures, it has been found that the difference between the temperature of the center of the disk and the ambient temperature, not the temperature of the disk itself, is important in specific cases. Such a specific case includes the case in which a disk is warped when the disk motor is heated. When the disk motor is heated, the inner circumference of the disk which is closer to the disk motor is heated more than the outer circumference of the disk causing a temperature gradient over the inner and outer circumferences of the disk. If the entire disk is heated uniformly, the disk will have little deformation, However, if the disk has a temperature difference between portions thereof, the disk is warped. Warping of the disk results in an increase in the aberration of an optical spot formed on the disk by an optical beam emitted from an optical head and thus a reduction in the reliability of recording and/or reproduction. Such differences between the portions of the disk are not conventionally detected and thus fail to effectively prevent warping of the disk.

An object of the present invention is to provide a disk device requiring a reduced amount of arithmetic operation and thus reducing the burden on a control section.

Another object of the present invention is to provide a disk device which performs temperature control capable of suppressing warping of a disk with high precision.

SUMMARY OF THE INVENTION

The disk device of this invention includes: a disk driving section for rotating a disk; a head for recording and/or reproducing information on and/or from the disk; a head moving section for moving the head from a start position to a destination position; a temperature calculation section for calculating a temperature change at a predetermined position, wherein the calculation is carried out based on the information of the start position and the destination position; and a control section for controlling the disk driving section and/or the head moving section depending on the temperature change calculated by the temperature calculation section.

In one embodiment of the invention, the temperature calculation section includes a timer, a heat value calculation sub-section, and an accumulation sub-section, wherein the timer starts counting lapse time from a point when the preceding temperature change has been calculated, the heat value calculation sub-section calculates a heat value of the disk driving section and/or the head moving section generated by the movement of the head from the start position to the destination position, and the accumulation sub-section calculates the temperature change based on the preceding temperature change, the lapse time, and the heat value and renews the temperature change.

In another embodiment of the invention, the timer counts a lapse time t defined as from a point when an (n−1)th temperature change has been calculated until a point when an n-th temperature change is calculated, wherein the heat value calculation sub-section calculates a heat value E as the heat value generated during the lapse time t, and the accumulation sub-section calculates the n-th temperature change based on the (n−1)th temperature change, the lapse time t and the heat value E.

In still another embodiment of the invention, the n-th temperature change is represented by expression (1) below or an approximate expression of expression (1):

$$T(n) = \exp\{-t/\tau\} \cdot T(n-1) + k \cdot E \quad (1)$$

where T(n) denotes the n-th temperature change, T(n−1) denotes the (n−1)th temperature change, τ denotes a time constant, and k denotes a coefficient.

In still another embodiment of the invention, the n-th temperature change is represented by expression (2) below:

$$T(n) = [1 - \{t/\tau\}] \cdot T(n-1) + k \cdot E \quad (2)$$

where T(n) denotes the n-th temperature change, T(n−1) denotes the (n−1)th temperature change, τ denotes a time constant, and k denotes a coefficient.

In still another embodiment of the invention, the heat value calculation sub-section calculates a moving distance of the head from the start position to the destination position and then calculates the heat value based on a function having the moving distance of the head as a variable.

In still another embodiment of the invention, the heat value calculation sub-section calculates the heat value based on a function having, as a variable, a change in an angular velocity of the disk in a time period during which the head moves from the start position to the destination position.

In still another embodiment of the invention, the disk driving section shifts an angular velocity of the disk to a destination angular velocity as the head moves from the start position toward the destination position, wherein when the head starts to move to a next destination position before the angular velocity of the disk has not reached the destination angular velocity, the heat value of the disk driving section and/or the head moving section is calculated based on a function having the lapse time counted by the timer as a variable.

In still another embodiment of the invention, the heat value calculation sub-section includes: a start angular velocity calculation portion for calculating a start angular velocity of the disk obtained when the head is located at the start position, a destination angular velocity calculation portion for calculating the destination angular velocity of the disk obtained when the head is located at the destination position; a reaching time calculation portion for calculating a reaching time required for the angular velocity of the disk to reach the destination angular velocity by being driven by the disk driving section, wherein the calculation is carried out based on the start angular velocity calculated by the start angular velocity calculation portion and the destination angular velocity calculated by the destination angular velocity calculation portion; and a comparison portion for selecting a shorter time between the reaching time calculated by the reaching time calculation portion and the lapse time counted by the timer, wherein the heat value of the disk driving section and/or the head moving section is calculated based on a function having the shorter time selected by the comparison portion as a variable.

In still another embodiment of the invention, the start angular velocity calculation portion calculates the start angular velocity based on expression (3) below or an approximate expression of expression (3):

$$\omega_s(n) = \omega_s(n-1) + C \cdot t_s \quad (3)$$

where $\omega_s(n)$ denotes the start angular velocity at the point when the n-th temperature change is calculated, $\omega_s(n-1)$ denotes the start angular velocity at the point when the (n−1)th temperature change has been calculated, $t_s$ denotes the shorter value selected by the comparison portion, and C denotes a constant.

In still another embodiment of the invention, the heat value calculation portion calculates the heat value of the disk driving section and/or the head moving section based on expression (4) below:

$$E = W \cdot t_s \qquad (4)$$

where E denotes the heat value, $t_s$ denotes the shorter time selected by the comparison portion, and W denotes a constant.

In still another embodiment of the invention, the temperature calculation section calculates the temperature change every time a head moving instruction for moving the head to a new destination position is issued.

In still another embodiment of the invention, the destination position in a head moving operation is set as a start position for the next head moving operation.

In still another embodiment of the invention, the control section sets an interval time $t_1$ for driving the disk driving section and/or the head moving section intermittently when the temperature change calculated by the temperature calculation section exceeds a predetermined threshold.

In still another embodiment of the invention, the interval time $t_1$ is calculated based on expression (5) below:

$$ti = \tau \cdot k \cdot E / Th \qquad (5)$$

where $\tau$, k, and Th denote constants, and E denotes the heat value of the disk driving section and/or the head moving section.

In still another embodiment of the invention, the control section reduces the driving current applied to the disk driving section and/or the head moving section when the temperature change calculated by the temperature calculation section exceeds a predetermined threshold.

In still another embodiment of the invention, the control section includes a servo controller and a current instruction value limiting section, the servo controller generates a current instruction value for specifying the driving current applied to the disk driving section and/or the head moving section, and the current instruction value limiting section limits the current instruction value to a predetermined range when the temperature change calculated by the temperature calculation section exceeds the predetermined threshold.

In still another embodiment of the invention, a method for calculating the temperature change by the temperature calculation section is changed as the driving current applied to the disk driving section and/or the head moving section is reduced.

In still another embodiment of the invention, the control section reduces the driving current applied to the disk driving section and/or the head moving section when the temperature change calculated by the temperature calculate on section exceeds a predetermined threshold, and the temperature calculation section changes the constant C in expression (3) as the driving current applied to the disk driving section and/or the head moving section is reduced.

In still another embodiment of the invention the control section reduces the driving current applied to the disk driving section and/or the head moving section when the temperature change calculated by the temperature calculation section exceeds a predetermined threshold, and the temperature calculation section changes the constant W in expression (4) as the driving current applied to the disk driving section and/or the head moving section is reduced.

In still another embodiment of the invention, the disk device further includes a disk identification section for identifying the type of a disk, wherein a method for calculating the temperature change by the temperature calculation section, or a method for controlling the disk driving section and/or the head moving section by the control section is changed depending on the type of the disk identified by the disk identification sections.

In still another embodiment of the invention, operation of the temperature calculation section and/or the control section is permitted or prohibited depending on the type of the disk identified by the disk identification section.

In still another embodiment of the invention, the disk device further includes a rotation setting section for setting a rotational frequency or a rotation linear velocity of the disk, wherein a method for calculating the temperature change by the temperature calculation section, or a method for controlling the disk driving section and/or the head moving section by the control section is changed depending on the rotational frequency and/or the rotation linear velocity set by the rotation setting section.

In still another embodiment of the invention, the disk rotation setting section sets the rotational frequency or the rotation linear velocity of the disk depending on whether a disk rotation method is a CAV method, a CLV method, or a ZCLV method.

In still another embodiment of the invention, when the disk rotation method is the CAV method, the rotation setting section sets a fixed rotational frequency, and the operation of the temperature calculation section and/or the control section is prohibited.

In still another embodiment of the invention, when the disk rotation method is the ZCLV method and seeks are performed within a same zone, the rotation setting section sets a fixed rotational frequency, and the operation of the temperature calculation section and/or the control section is prohibited, and when the seeks extend to a different zone, the rotational frequency is changed by the rotation setting section, and the operation of the temperature calculation section and/or the control section is permitted.

In still another embodiment of the invention, the temperature calculation section calculates a temperature difference between portions of the disk.

Alternatively, the disk device of this invention includes: a disk driving section for rotating a disk; a head for recording and/or reproducing information on and/or from the disk; a head moving section for moving the head from a start position to a destination position; a temperature calculation section for calculating a temperature difference between portions of the disk; and a control section for controlling the disk driving section and/or the head moving section depending on the temperature difference calculated by the temperature calculation section.

In one embodiment of the invention, the control section reduces a driving current applied to the disk driving section when the temperature difference calculated by the temperature calculation section exceeds a predetermined threshold.

In another embodiment of the invention, the temperature calculation section includes a first temperature measurement element for detecting a temperature near an inner circumference of the disk and a second temperature measurement element for detecting a temperature near an outer circumference of the disk, and calculates a difference between the temperatures detected by the first and second temperature measurement elements.

Thus, the invention described herein makes possible the advantages of (1) providing a disk device requiring a reduced amount of arithmetic operation and thus reducing the burden on a control section, and (2) providing a disk device which performs temperature control capable of suppressing warping of a disk with high precision.

These and other advantages of the present invention will become apparent to those skilled in the art upon reading and understanding the following detailed description with reference to the accompanying figures.

DESCRIPTION OF THE PREFERRED EMBODIMENTS (Embodiment 1)

Figure 1:
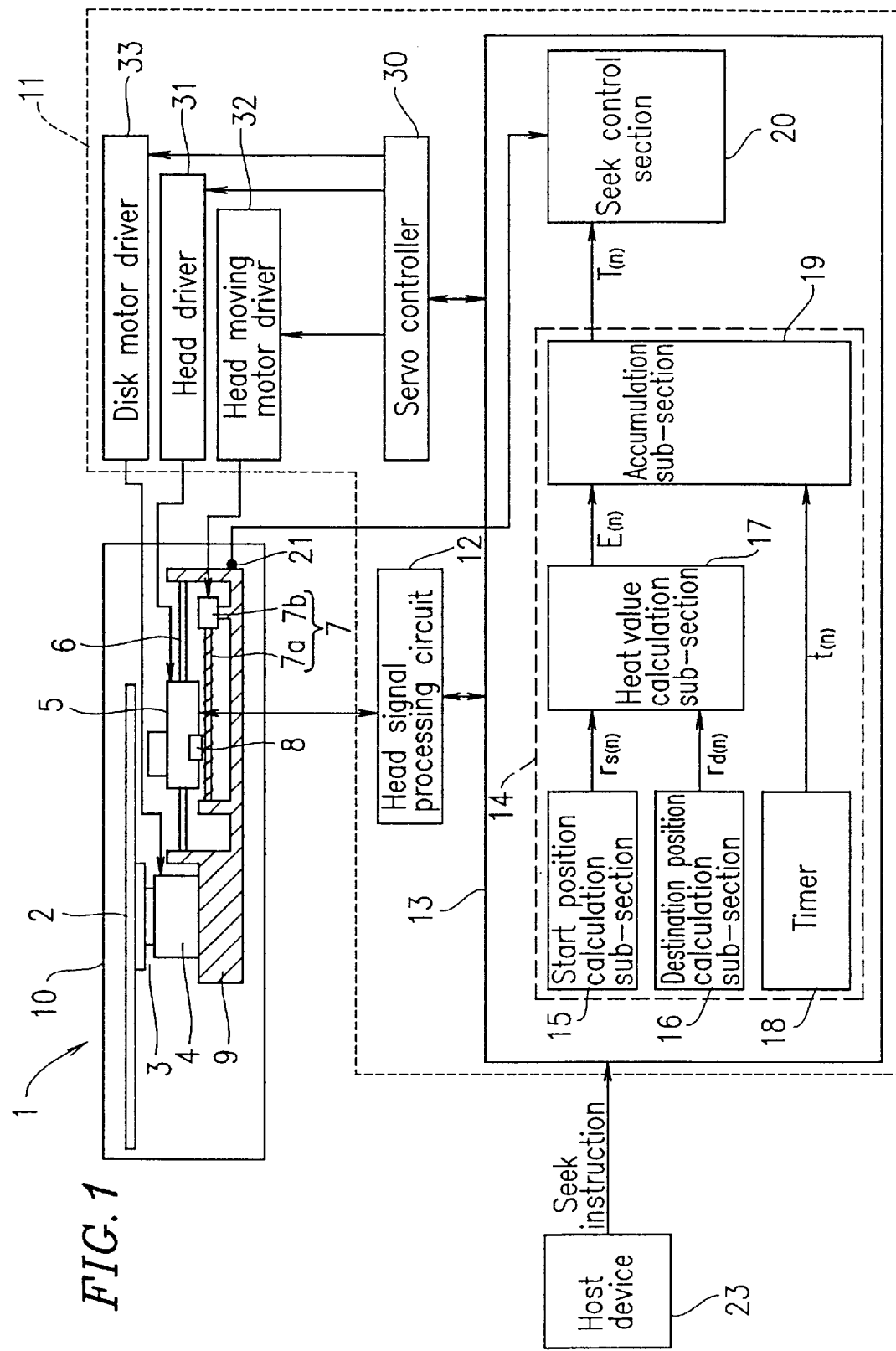
FIG. 1 is a block diagram schematically illustrating an optical disk device of Embodiment 1 according to the present invention.

FIG. 1 schematically illustrates an optical disk device 1 of Embodiment 1 according to the present invention. The internal temperature of the optical disk device 1 rises due to heat generated by a head moving motor 7 when a seek operation is continuously repeated a plurality of times. In Embodiment 1, such a temperature rise is suppressed by temporarily prohibiting the seek.

Referring to FIG. 1, the optical disk device 1 receives an optical disk 2, which may be a read-only optical disk, such as a CD or a DVD-ROM (digital versatile disk ROM), or a rewritable optical disk, such as a PD and a DVD-RAM, by means of a loading mechanism (not shown), and upon identifying the type of the optical disk 2, records/reproduces information on and/or from the optical disk 2. The loaded optical disk 2 is placed on a turntable 3 and rotated by a disk motor 4. An optical head 5 executes recording and/or reproduction of information on and/or from the optical disk 2. The optical head 5 is supported by a guide shaft 6 movable in a direction of the radius of the optical disk 2 and moved forward and backward by the head moving motor 7. The head moving motor 7 includes a feed screw 7a and a stepping motor 7b for rotating the feed screw 7a. The feed screw 7a engages with a rack 8 secured to the optical head 5, so that the rack 8 is moved as the feed screw 7a is rotated by the stepping motor 7b and then the optical head 5 is moved. The disk motor 4, the guide shaft 6, and the head moving motor 7 are mounted on a chassis 9. A case 10 encloses the chassis 9 together with the components mounted thereon for dust prevention.

The optical disk device also includes a circuit part 11. The circuit part 11 includes a head signal processing circuit 12, an upper-level controller 13, a servo controller 30, a head driver 31, a head moving motor driver 32, and a disc motor driver 33.

The head signal processing circuit 12 receives a signal read from the optical disk 2 by the optical head 5, and produces a servo signal and a digitized data signal based on the received signal. The data signal includes address information indicating the position on the disk at which data is recorded.

The upper-level controller 13 includes a CPU, a digital signal processor (DSP), RAM, ROM, and the like although these are not shown in FIG. 1, and controls the device based on programs and data pre-stored in the ROM. For example, the upper-level controller 13 exchanges commands with and transfers data to a host device 23 via an SCSI interface (not shown), and controls various components in the optical disk device 1 including the head signal processing circuit 12 and the servo controller 30. The upper-level controller 13 includes a temperature calculation section 14 and a seek control section 20.

The temperature calculation section 14 predicts temperature rise of the head moving motor 7, and includes a start position calculation sub-section 15, a destination position calculation sub-section 16, a heat value calculation sub-section 17, a timer 18, and an accumulation sub-section 19. In the upper-level controller 13, temperature prediction is performed by the temperature calculation section 14 immediately before the start of execution of a seek instruction issued by the host device 23, to obtain a temperature prediction value which is to be used for the control by the upper-level controller 13. More specifically, immediately before the n-th seek instruction counted from the initial state in which the device has just been powered is executed (n is a natural number), the temperature calculation section 14 performs the n-th temperature prediction operation and renews the temperature prediction value. In the subsequent description, a subscript (n) added to a code indicating an output or the like represents that the output, for example, is an output at the n-th temperature prediction.

The start position calculation sub-section 15 calculates a start position $r_s(n)$ of the optical head 5 based on address information output from the head signal processing circuit 12 The start position $r_s(n)$ represents the radius of a track at which information is currently being recorded or reproduced.

The destination position calculation sub-section 16 calculates a destination position $r_d(n)$ of the optical head 5 based on destination address information supplied by a seek instruction from the host device 23. The destination position $r_d(n)$ represents the radius of a track at which the seek is completed.

The optical disk device of this embodiment can perform recording and/or reproduction for a plurality of types of optical disks. Therefore, the optical disk device pre-stores in the ROM an approximate expression or a data table indicating the relationship between the address information and the track radial position for each type of optical disk.

The heat value calculation sub-section 17 calculates the difference between the destination position $r_d(n)$ and the start position $r_s(n)$ as a head moving distance $s(n)$ $(=|r_d(n)-r_s(n)|)$, and predicts a heat value $E(n)$ of the head moving motor 7 obtained when one seek is executed based on the head moving distance $s(n)$. The relationship between the head moving. distance $s(n)$ and the heat value $E(n)$ is obtained experimentally and pre-stored it the ROM as an approximate expression or a data table. In this embodiment, the relationship between the head moving distance $s(n)$ and the heat value $E(n)$ is obtained by expression (6) which is a secondary approximate expression:

$$E(n) = -C_1 \cdot s(n)^2 + C_2 \cdot s(n) \qquad (6)$$

wherein $C_1$ and $C_2$ denote positive constants.

The timer 18 has a timer function using an operation clock of the CPU, and measures a lapse time $t(n-1)$ counted from the (n−1)th temperature prediction until the n-th temperature prediction and outputs the results.

The accumulation sub-section 19 calculates the n-th temperature prediction value T(n) according to recurrence expression (7) below, using the (n−1)th temperature prediction value T(n−1), the lapse time t(n−1), and the heat value E. The temperature prediction value T(n) indicates a temperature difference between an object to be controlled and the environment of the object to be controlled, not the temperature of the object to be controlled itself. More strictly, this definition of the temperature prediction value T(n) is only effective under the conditions where the ambient heat capacity is sufficiently large and the ambient temperature change is slow compared with the temperature change of the object to be controlled.

$$T(n)=\exp\{-t(n-1)/\tau\}\cdot T(n-1)+k\cdot E(n) \quad (7)$$

wherein τ and k denote positive constants.

The first term of the right side of expression (7) represents a temperature drop due to spontaneous heat emission, and the second term thereof represents a temperature rise due to heat generation during one seek. The constants τ and k are a time constant and a constant representing a heat capacity of the object to be controlled, respectively, which are obtained experimentally and pre-stored in the ROM.

The seek control section 20 compares the temperature prediction value T(n) and a threshold value $T_{th}(n)$, if the temperature prediction value T(n) is equal to or less than the threshold value $T_{th}(n)$, an interval time $t^i(n)$ is not set (or the interval time $t_i(n)$ is set at zero). If the temperature prediction value T(n) exceeds the threshold value $T_{th}(n)$, the interval time $t_i(n)$ is calculated according to expression (8) below.

$$t_i(n)=\tau\cdot k\cdot E(n)/T_{th}(n) \quad (8)$$

The temperature prediction value T(n) indicates the temperature difference between the object to be controlled and the environment, not the temperature of the object to be controlled itself, as described above. Accordingly, the threshold value $T_{th}(n)$ representing an allowable value of the temperature difference is set as a value obtained by subtracting the ambient temperature from the allowable temperature of the head moving motor 7. More specifically, the threshold value $T_{th}(n)$ is set in the following manner: The output of a thermistor 21 attached to the chassis 9 is converted to temperature data by an A/D converter (not shown) to obtain an ambient temperature value $T_a(n)$, and the ambient temperature value $T_a(n)$ is subtracted from a value indicating the preset allowable temperature stored in the ROM, to obtain the threshold value $T_{th}(n)$.

If the interval time $t_i(n)$ is not set (or the interval time $t_i(n)$ is set at zero), the seek control section 20 issues a seek permission to the upper-level controller 13 so that a seek can be immediately executed in response to the seek instruction from the host device 23.

If the interval time $t_i(n)$ is set according to expression (8), a second timer (not shown) counts a lapse time from the n-th temperature prediction. As soon as the lapse time exceeds the interval time $t_i(n)$, the seek control section 20 issues a seek permission to the upper-level controller 13 so that a seek can be executed in response to the seek instruction from the host device 23. This enables at least the interval time $t_i(a)$ to be provided during the time period from the start of the execution of the n-th seek instruction until the start of the execution of the (n+1)th seek instruction.

The servo controller 30 controls the head driver 31 the head moving motor driver 32, and the disk motor driver 33 based on the servo signal output from the head signal processing circuit 12 and an instruction from the upper-level controller 13. The head driver 31 drives a laser of the optical head 5 and drives a focusing/tracking control actuator (not shown). The head moving motor driver 32 drives the head moving motor 7. The disk motor driver 33 drives the disk motor 4.

The operation of the optical dish device 1 with the above configuration will be described.

First, the upper-level controller 13 drives and controls the head moving motor 7 via the servo controller 30 and the head moving motor driver 32, to move the optical head 5 to a predetermined position located above the inner circumference of the optical disk 2. The upper-level controller 13 then drives and controls the optical head 5 via the servo controller 30 and the head driver 31 so that a signal is read from the optical disk 2, and thus detects the existence of the optical disk 2 based on the output from the head signal processing circuit 12. The upper-level controller 13 then rotates the disk motor 4 via the servo controller 30 and the disk motor driver 33, and while rotating the disk motor 4, extracts a data signal indicating the type of the optical disk 2 from the output of the head signal processing circuit 12 to identify the type of the optical disk 2.

The start position calculation sub-section 15 and the destination position calculation sub-section 16 select an approximate expression or a data table indicating the relationship between the address information and the track radial position stored in the ROM depending on the type of the optical disk 2.

The timer 18 starts the counting of a lapse time t(0) as n=0, although temperature prediction has not yet been started. The accumulation sub-section 19 stores in the RAM the temperature prediction value T as an initial value T(0)=0. The disk motor 4 rotates the optical disk 2 at a rotational frequency determined depending on the type of the optical disk 2.

Thus, the optical disk device 1 is now in a state of being ready for recording and/or reproducing information on and/ or from the optical disk 2. In this state, when the first seek instruction is issued by the host device 23, the start position calculation sub-section 15 calculates a start position $r_s(1)$, and the destination position calculation sub-section 16 calculates a destination position $r_d(1)$. The heat value calculation sub-section 17 calculates a head moving distance s(1) from the difference between the destination position $r_d(1)$ and the start position $r_s(1)$, and predicts a heat value E(1) of the head moving motor 7 according to expression (6). The timer 18 terminates the counting of the lapse time and outputs the resultant lapse time t(0). The timer 18 simultaneously starts new counting of a next lapse time t(1). The accumulation sub-section outputs a temperature prediction value T(1) according to expression (7). The seek control section 20 compares the temperature prediction value T(1) and a threshold value $T_{th}(1)$. If the temperature value T(1) is equal to or less than the threshold value $T_{th}(1)$, an interval time $t_i(n)$ is not set (or the interval time $t_i(n)$ is set at zero). If the temperature value T(1) exceeds the threshold value $T_{th}(1)$, the interval time $t_i(1)$ is calculated according to expression (8).

The seek control section 20 outputs a flag prohibiting execution of a next seek to the upper-level controller 13 for the interval time $t_i(1)$ so that the second seek is not executed during the time period from the start of the seek executed in response to the first seek instruction through the lapse of the interval time $t_i(1)$. As for the first seek instruction, the upper-level controller 13 issues an execution instruction to the servo controller 30, so that the head moving motor driver 32 drives the head moving motor 7 and thus moves the optical head 5.

Substantially the same processing as that for the first seek instruction as described above is performed when the second and the subsequent seek instructions are issued.

When the n-th seek instruction is issued, the interval time $t_i(n)$ is calculated in the manner as described above, and the upper-level controller 13 controls so that the (n+1)th seek instruction is not executed until the interval time $t_i(n)$ lapses from the start of the n-th seek.

Thus, by the control described above, a required interval time is set only when the seek instruction is excessively frequently issued by the host device 23, whereby temperature rise due to the seek can be suppressed to a threshold value or less.

In general, the temperature rise due to one seek is considerably smaller than the threshold value $T_{th}$. The temperature prediction value T(n) exceeds the threshold value $T_{th}$ in such a case that the number of seek instructions on the order of a thousand have been continuously issued by the host device 23. In reality, therefore, the control of setting the interval time is performed only when a great number of seek instructions have been frequently generated.

Even when the seek control section 20 prohibits the execution of a seek instruction for the interval time $t_i(n)$, an instruction other than the seek instruction can be executed, allowing recording and/or reproduction to be performed. Accordingly, when a data amount for recording and/or reproduction is large, for example, the interval time $t_i(n)$ may lapse before the recording and/or reproduction operation is completed. In such a case, no standby time exists substantially. In otherwords, a standby time exists only when a time $t_p(n)$ required to actually execute the n-th seek upon receipt of the n-th seek instruction and complete the recording and/or reproduction operation is shorter than the interval time $t_i(n)$. That is, the difference between the time $t_p(n)$ and the interval time $t_i(n)$ indicates a substantial standby time.

Thus, in Embodiment 1 according to the present invention, the temperature calculation section 14 calculates the temperature prediction value T using the start position $r_s$ and the destination position $r_d$ of the optical head 5 only when a seek instruction is issued. Since the frequency at which the seek instruction is issued is low and the arithmetic operation is merely repeated at this frequency, the amount of arithmetic operation is small, reducing the burden on the temperature calculation section 14. Moreover, since temperature drop due to spontaneous heat emission is taken into consideration, temperature prediction can be performed with high precision. As a result, control of limiting the temperature rise to an allowable temperature or less is possible even for a portion of the device where direct temperature measurement is difficult.

Since temperature prediction is required only when a seek instruction from the host device 23 is executed, the period of the temperature prediction is only about 10 to 100 msec even when the seek instruction is issued most frequently. As a result, the burden on the temperature calculation section 14 can be greatly reduced, compared with the conventional case of performing frequent interruption at a sampling period of 66 μsec. Furthermore, since no temperature prediction operation is required when no seek instruction is issued, the burden on the temperature calculation section 14 can be further reduced.

Conventionally, during the recording and/or reproduction, for example, interruption processing for temperature prediction is required even when the control section is extremely busy in data transfer, error processing, and the like. In this embodiment, however, temperature prediction is substantially completed at the starting point of the execution of a seek instruction. Accordingly, temperature prediction can be performed during a time period other than the busy time of recording and/or reproduction. This enables averaging the control and arithmetic operation performed by the entire upper-level controller 13 and thus reduces the burden on the upper-level controller 13.

Since the temperature calculation section 14 calculates the temperature prediction value based on the head moving distance s(n), accumulation of all of previous information is not necessary, but information can be sequentially renewed. This allows for a reduction in the memory capacity and the amount of arithmetic operation required for performing temperature prediction, thereby reducing the cost of the device. As a result, the burden on the control section for temperature prediction can be greatly reduced even for a system in which the time constant of an object to be controlled is large compared with the seek interval and the current temperature prediction is affected by the entire seek history including a large number of seek instructions on the order of a thousand, and for a complicated system in which each seek is performed completely at random and the heat value for each seek differs depending on the seek distance, for example.

In this embodiment, address information obtained from the optical disk 2 is used for the calculation of the start position $r_s(n)$ at the n-th temperature prediction by the start position calculation sub-section 15. Alternatively, a destination position $r_d(n-1)$ at the (n−1)th temperature prediction may be used as the start position $r_s(n)$ at the n-th temperature prediction. In this case, it is substantially unnecessary to receive the start position $r_s(n)$ externally, but only necessary to be given the destination position $r_d(n)$ This is sufficiently practical because the error of the start position $r_s(n)$ is small if the frequency of the issuance of an seek instruction is high, and temperature prediction becomes important only when the seek frequency is high.

In this embodiment, the accumulation sub-section 19 calculates the n-th temperature prediction value T(n) according to expression (7). The same effect can also be obtained by using an approximate expression substantially equal to expression (7). In particular, using expression (9) below obtained by primary approximation of the first term of the right side of expression (7), a control with sufficiently good precision can be obtained by simple calculation.

If $t(n-1) \leq \tau$, $T(n)=[1-\{t(n-1)/\tau\}]\cdot T(n-1)+k\cdot E(n)$, or if $t(n-1)>\tau$, $T(n)=k\cdot E(n)$ \hfill (9)

In this embodiment, the temperature calculation section 14 performs temperature prediction operation every time one seek instruction is issued. The present invention is not limited to the above, but the temperature calculation section 14 may perform temperature prediction operation every time a predetermined number of seek instructions are issued.

Furthermore, the temperature calculation section 14 may perform temperature prediction based on all information on the start position and the destination position of every seek performed during a predetermined time period (e.g., one second). Accordingly, the lapse time t as the output of the timer 18 is not necessarily a variable.

(Embodiment 2)

Figure 2:
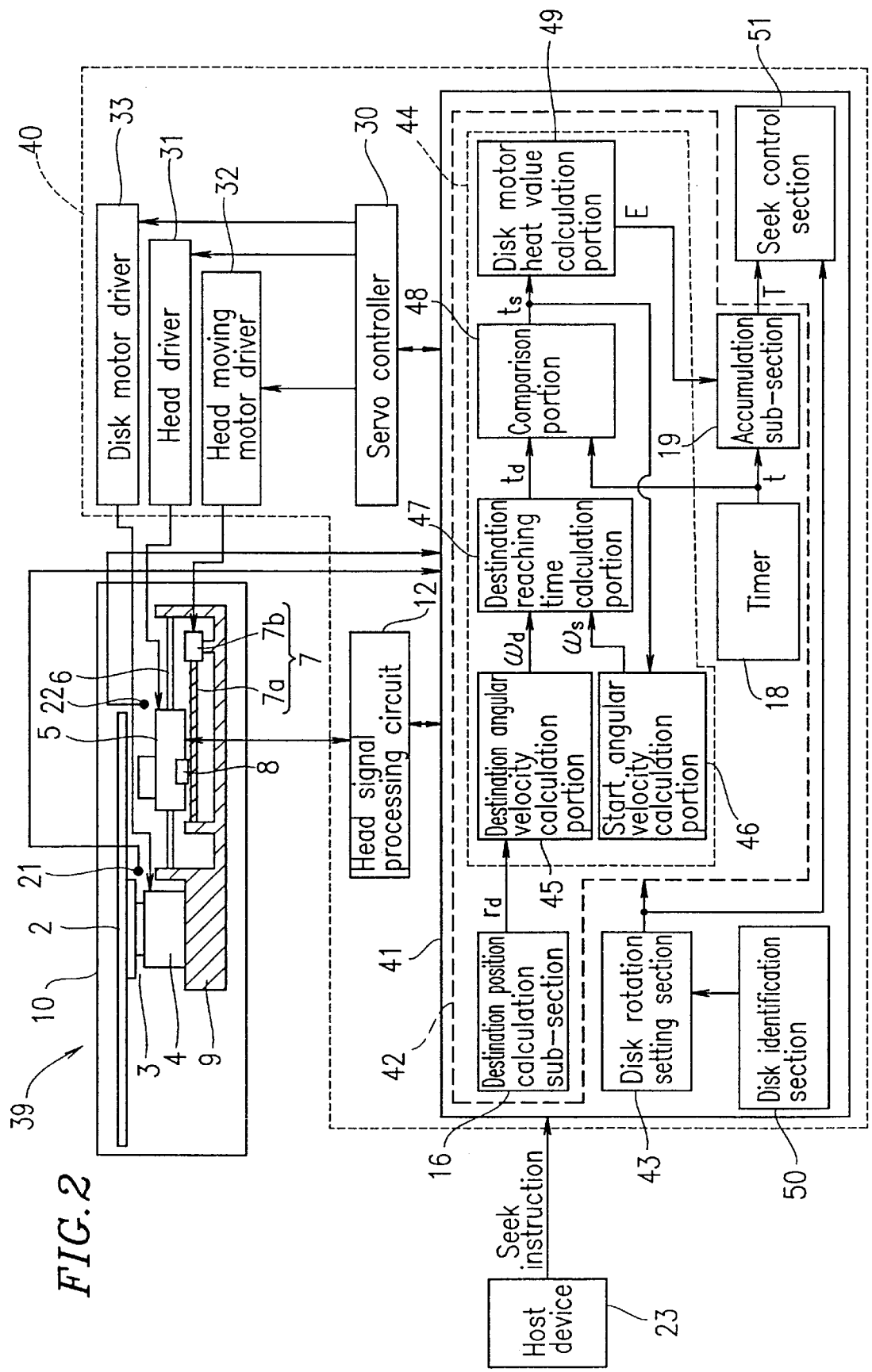
FIG. 2 is a block diagram schematically illustrating an optical disk device of Embodiment 2 according to the present invention.

FIG. 2 schematically illustrates an optical disk device 39 of Embodiment 2 according to the present invention The internal temperature of the optical disk device 39 rises due to heat generated by the disk motor 4 when a seek operation is continuously repeated a plurality of times. In Embodiment 2, such temperature rise is suppressed by temporarily prohibiting the seek.

Referring to FIG. 2, the turntable 3, the disk motor 4, the optical head 5, the guide shaft 6, the head moving motor 7, the rack 8, the chassis 9, the case 10, the head signal processing circuit 12, the destination position calculation sub-section 16, the timer 18, the accumulation sub-section 19, the servo controller 30, the head driver 31, the head moving motor driver 32, and the disk motor driver 33 are the same as those in Embodiment 1.

The optical disk device 39 receives the optical disk 2, which may be a read-only optical disk such as a CD or a DVD-ROM, or a rewritable optical disk such as a PD and a DVD-RAM, by means of a loading mechanism (not shown), and upon identifying the type of the optical disk 2, records/reproduces information on and/or from the optical disk 2.

A circuit part 40 includes the head signal processing circuit 12, an upper-level controller 41, the servo controller 30, the head driver 31, the head moving motor driver 32, and the disk motor driver 33.

The upper-level controller 41 includes a CPU, a DSP, RAM, ROM, and the like, although these are not shown in FIG. 2, and controls the device based on programs and data pre-stored in the ROM. For example, the upper-level controller 41 exchanges commands with and transfers data to the host device 23 via an external interface (not shown), and controls various components in the optical disk device 39 including the head signal processing circuit 12 and the servo controller 30. The upper-level controller 41 includes a temperature calculation section 42, a seek control section 51, a disk rotation setting section 43, and a disk identification section 50.

The temperature calculation section 42 includes the destination position calculation sub-section 16, a heat value calculation sub-section 44, the timer 18, and the accumulation sub-section 19, and outputs the temperature prediction value T representing the difference between the temperature of the disk motor 4 itself and the ambient temperature around the disk motor 4 (corresponding to the temperature difference between the inner circumference and the outer circumference of the optical disk 2 which is caused by heat generated by the disk motor 4).

The disk identification section 50 extracts a data signal representing the type of the disk from the output of the head signal processing circuit 12 to identify the type of the disk. The disk rotation setting section 43 selects a disk rotation method among a constant angular velocity (CAV) method, a constant linear velocity (CLV) method, and a zone constant linear velocity (ZCLV) method depending on the type of the disk identified by the disk identification section 50, and allocates the rotational frequency or the linear velocity of the optical disk 2.

The disk rotation setting section 43 also varies the relationship between the destination position $r_d$ and the temperature prediction value T by varying the value of a constant used by the temperature calculation section 42 depending on the disk type or the disk rotation method, or varies the relationship between the temperature prediction value T and the seek by varying the operation state of the seek control section 51, as will be described hereinafter. This operation is performed because the temperature rise of the disk motor 4 depends on the rotation method and rotational frequency of the disk.

In the case where the CAV method is employed as the disk rotation method, the temperature rise of the disk motor 4 is constant and stays below a threshold value, regardless of whether or not the seek is performed. Accordingly, the disk rotation setting section 43 prohibits the operation of the temperature calculation section 42 and the seek control section 51. It should be noted that the seek operation is not limited by this prohibition.

In the case where the CLV method or the ZCLV method is employed as the disk rotation method, the disk rotation setting section 43 permits the operation of the temperature calculation section 42 and the seek control section 51. In this case, the disk rotation setting section 43 allocates a selected disk linear velocity v to the heat value calculation sub-section 44. In the case of the ZCLV method in which the angular velocity varies in every zone, the linear velocity values for all zones are approximated to a fixed value and the approximated linear velocity is allocated to the heat value calculation sub-section 44 as the disk linear velocity V. For example, in the case where the optical disk 2 is a DVD-ROM, the linear velocity is 3.49 m/s for CLV single or 6.98 m/s for CLV double. In the case of a DVD-RAM having a capacity of 2.6 GB, the approximated linear velocity for ZCLV is 6.16 m/s. The disk linear velocity v is data representing such a velocity value.

If the disk rotation setting section 43 permits the operation of the temperature calculation section 42, the upper-level controller 41 performs temperature prediction in the temperature calculation section 42 every time a seek instruction from the host device 23 is executed, so as to effect control depending on the predicted temperature. It should be noted that no temperature prediction is performed for the first seek instruction, but a temperature rise due to the preceding seek is predicted at the start of the execution of the second seek instruction. This means that the timing at which the temperature prediction result is obtained is delayed by one seek. The temperature prediction value T(n) at the n-th temperature prediction is obtained at the start of the execution of the (n+1) th seek instruction. As in Embodiment 1, in the subsequent description, the subscript (n) added to a code indicating an output or the like represents that the output, for example, is an output at the n-th temperature prediction.

The heat value calculation sub-section 44 includes a destination angular velocity calculation portion 45, a start angular velocity calculation portion 46, a destination reaching time calculation portion 47, a comparison portion 48, and a disk motor heat value calculation portion 49. The heat value calculation sub-section 44 receives the destination position $r_d(n)$ obtained by the destination position calculation sub-section 16, the disk linear velocity v obtained by the disk rotation setting section 43, and the lapse time t counted from the time of the preceding temperature prediction (substantially equal to the time of the start of a seek) by the timer 18, and outputs the heat value E(n) of the disk motor 4 obtained when one seek is performed.

The heat value calculation sub-section 44 has two constructional features. The first feature is that the heat value E is calculated based on a change in the angular velocity of the optical disk 2. The second feature is that, in order to support jitter-free reproduction, the heat value E is calculated after determining whether or not the next seek has been performed before the optical disk 2 reaches the destination angular velocity using the lapse time t output from the timer 18.

The destination angular velocity calculation portion 45 receives the destination position $r_d(n)$ from the destination position calculation sub-Section 16 and the disk linear velocity v from the disk rotation setting section 43, and calculates a destination angular velocity $\omega_d(n)$ of the optical disk 2 at the destination position $r_d(n)$. In the case of the CLV method, the destination angular velocity $\omega_d(n)$ is calculated according to expression (10) below. In the case of the ZCLV method, the destination angular velocity $\omega_d(n)$ is calculated according to expression (10) for each zone using, as the destination position $r_d(n)$, the radius of a track in the center of a zone in which the destination position is located. This means that the same destination angular velocity $\omega_d(n)$ is shared in one zone.

$$\omega_d(n)=v/r_d(n) \quad (10)$$

The optical disk device of this embodiment can perform recording and/or reproduction for a plurality of types of optical disks. To accomplish this, the optical disk device pre-stores in the ROM an approximate expression or a data table indicating the relationship between the address information and the track radial position for each type of optical disks. Therefore, if the address information is known, the destination position $r_d(n)$ can be obtained.

The start angular velocity calculation portion 46 calculates a start angular velocity $\omega_s(n)$ of the optical disk 2 at the n-th temperature prediction operation. The start angular velocity $\omega_s(n)$ i calculated according to expression (11) below, i.e., by adding a change in the angular velocity predicted from a powered time $t_s(n-1)$ of the disk motor 4 to a start angular velocity $\omega_s(n-1)$ at the (n-1)th temperature prediction operation. The powered time $t_s(n-1)$ is obtained by the comparison portion 48 as will be described hereinafter.

$$\omega_s(n)=\omega_s(n-1)+C \cdot t_s(n-1) \quad (11)$$

wherein C denotes a positive constant determined from a torque generated in the disk motor 4 and a disk inertia moment, which is experimentally obtained and pre-stored in the ROM.

The destination reaching time calculation portion 47 calculates a powered time $t_d(n)$ required for the optical disk 2 to reach the destination angular velocity $\omega_d(n)$ according to expression (11) below based on the destination angular velocity $\omega_d(n)$ and the start angular velocity $\omega_s(n)$. The powered time or the destination reaching time $t_d(n)$ is positive or negative depending on whether the rotation of the optical disks 2 is accelerated or decelerated.

$$t_d(n)=\{\omega_d(n)-\omega_s(n)\}/C \quad (12)$$

The comparison portion 48 compares the destination reaching time $t_d(n)$ with the lapse time $t(n)$ output from the timer 18, and outputs a smaller one as the actual powered time $t_s(n)$. More specifically, it is determined that the absolute of the powered time $t_s(n)$ is equal to a smaller one of the absolute of the destination reaching time $t_d(n)$ and the lapse time $t(n)$, and the sign (plus or minus) of the powered time $t_s(n)$ is the same as the sign of the destination reaching time $t_d(n)$. The resultant powered time $t_s(n)$ is supplied to the start angular velocity calculation portion 46 and the disk motor heat value calculation portion 49.

The disk motor heat value calculation portion 49 calculates the heat value E(n) according to expression (13) below, i.e., by multiplying a constant W representing consumed power of the diskmotor 4 by the powered time $t_s(n)$. The constant W is experimentally obtained and pre-stored in the ROM.

$$E(n)=W \cdot t_s(n) \quad (13)$$

In jitter-tree reproduction, a signal is read from the optical disk 2 even when the optical disk 2 has not reached the destination angular velocity. In such a case, a seek may be completed before the optical disk 2 reaches the destination angular velocity $\omega_d(n)$, and subsequently the next seek may be started. Therefore, the heat value E(n) varies depending on whether the next seek is started before or after the optical disk 2 reaches the destination angular velocity $\omega_d(n)$.

If the next seek is started after the optical disk 2 reaches the destination angular velocity $\omega_d(n)$, the lapse time $t(n)$ output from the timer 18 is longer than the destination reaching time $t_d(n)$, and expression (13) is equal to expression (14) below, indicating that the heat value E(n) can be expressed as a function of the difference between the destination angular velocity $\omega_d(n)$ and the start angular velocity $\omega_s(n)$.

$$E(n)=W \cdot (\omega_d(n)-\omega_s(n))/C \quad (14)$$

If the next seek is started before the optical disk 2 reaches the destination angular velocity $\omega_d(n)$, the destination reaching time $t_d(n)$ is longer than the lapse time $t(n)$ output from the timer 18, and expression (13) is equal to expression (15) below, indicating that the heat value E(n) can be expressed as a function of the lapse time t output from the timer 18.

$$E(n)=W \cdot t(n) \quad (15)$$

When the ZCLV method is employed as the rotation method for the optical disk 2 and seeks are performed within the same zone, the rotational frequency of the optical disk 2 does not change and expression (14) is applied. Thus, the heat value E(n) is zero.

The seek control section 51 is the same as the seek control section 20 in Embodiment 1, except that a threshold value $T_{th}$ which is a fixed value obtained experimentally and pre-stored in the ROML is used and that the operation thereof is permitted or prohibited by the disk rotation setting section 43. If the operation is prohibited by the disk rotation setting section 43, the seek control section 51 does not set the interval time $t_i$.

The operation of the optical disk device 39 with the above configuration will be described.

First, the upper-level controller 41 drives and controls the head moving motor 7 so that the optical head 5 moves to a predetermined position $r_d(0)$ located above the inner circumference of the optical disk 2. The upper-level controller 41 then detects the existence of the optical disk 2 via the optical head 5. Thereafter, while rotating the disk motor 4, the upper-level controller 41 identifies the type of the optical disk 2 based on the output from the head signal processing circuit 12. In the subsequent description, it is assumed that the type of the optical disk 2 has been identified as a DVD-RAM.

Since the type of the optical disk 2 is a DVD-RAM, the disk rotation setting section 43 sets the rotation method for the disk motor 4 to be the ZCLV method, permits the operation of the temperature calculation section 42 and the seek control section 51, and outputs the disk linear velocity v to the heat value calculation sub-section 44.

The start angular velocity calculation portion 46 calculates a start angular velocity $\omega_s(1)$ as the initial value according to expression (16) below. The start angular velocity $\omega_s(1)$ is data indicating the disk angular velocity observed when the optical head 5 is located at the predetermined position $r_d(0)$ described above.

$$\omega_s(1)=v/r_d(0) \quad (16)$$

The destination position calculation sub-section 16 selects an approximate expression or a data table indicating the relationship between the address information and the destination position on the DVD-RAM stored in the ROM. The timer 18 starts counting the lapse time t(0). The accumulation sub-section 19 stores the initial value T(0) of the temperature prediction value T in the RAM as T(0)=0.

Thus, the optical disk device is now in the state of being ready for recording and/or reproducing information on and/ or from the optical disk 2 in this state, when the first seek instruction is issued by the host device 23, the destination position calculation sub-section 16 calculates the destination position $r_d(1)$ from the address information. The destination angular velocity calculation portion 45 receives the destination position $r_d(1)$ and calculates a destination angular velocity $\omega_d(1)$ of the optical disk 2 at the destination position $r_d(1)$. The destination reaching time calculation portion 47 receives the destination angular velocity $\omega_d(1)$ and the start angular velocity $\omega_s(1)$, and calculates a powered time $t_d(1)$ required to reach the destination angular velocity $\omega_d(1)$.

When the second seek instruction is issued by the host device 23, the timer 18 terminates counting the time and outputs the lapse time t(1). Simultaneously, the timer 18 newly starts counting a next lapse time t(2). The comparison portion 48 compares the destination reaching time $t_d(1)$ with the lapse time t(1) to obtain a powered time $t_s(1)$ during which power has been actually supplied to the disk motor 4. The disk motor heat value calculation portion 49 receives the powered time $t_s(1)$ and calculates the heat value E(1) according to expression (13). The accumulation sub-section 19 outputs the temperature prediction amount T(1) based on the heat value E(1). The seek control section 51 compares the temperature prediction value T(1) with the threshold value $T_{th}(1)$ to calculate the interval time $t_i(1)$ according to expression (8), so as to ensure that the third seek instruction is not executed within the interval time $t_i(1)$ after the start of the seek in response to the second seek instruction. The threshold value $T_{th}$ is a fixed value obtained experimentally and pre-stored in the ROM, which represents a temperature at which the warp angle of the optical disk 2 reaches an allowable limit value.

The start angular velocity calculation portion 46 receives the powered time $t_s(1)$ and outputs a next start angular velocity $\omega_s(2)$. As in the first seek instruction, the destination position calculation sub-section 16 calculates a destination position $r_d(2)$, the destination angular velocity calculation portion 45 calculates a destination angular velocity $\omega_d(2)$, and the destination reaching time calculation portion 47 calculates a destination reaching time $t_d(2)$.

The same procedure as that for the second seek instruction is performed when the third or subsequent seek instruction is issued.

When the m-th seek instruction is issued (m is a natural number), an interval time $t_i(m-1)$ is calculated in the same manner as that described above. The upper-level controller 41 controls the device so that the (m+1)th seek instruction is not executed within the interval time $t_i(m-1)$. Since the timing at which the temperature prediction result is obtained is delayed by one seek as described above, the timing at which the seek is prohibited is also delayed. In general, however, since the temperature rise of the disk motor 4 corresponding to one seek is considerably smaller than the threshold value $T_{th}$, substantially no problem arises by this delay.

By the control described above, a required interval time is set only when the seek instruction is excessively frequently issued by the host device 23, whereby the temperature rise of the disk motor 4 due to the seek can be suppressed to a threshold value or less.

Thus, in Embodiment 2 according to the present invention, the temperature prediction value T is calculated only when a seek instruction is issued. Since the frequency at which the seek instruction is issued is low and the arithmetic operation is merely repeated at this frequency, the amount of the arithmetic operation is small, reducing the burden on the temperature calculation section 42. Moreover, since a temperature drop due to spontaneous heat emission is taken into consideration, temperature prediction can be performed with high precision. As a result, the control of limiting the temperature rise to an allowable temperature or less is possible even for a portion of the device at which direct temperature measurement is difficult.

Moreover, in this embodiment in which the temperature prediction for the disk motor 4 is performed, the following effects are obtained.

(1) High-precision temperature prediction is possible even for a disk device employing jitter-free reproduction. The jitter-free reproduction is a method in which a signal is read from the optical disk 2 before the rotation of the optical disk 2 reaches a destination rotational frequency. When seek operation is continuously repeated a plurality of times in a disk device employing this method, the next seek is started before the rotation of the disk motor 4 reaches a destination rotational frequency. This widens the difference between the destination rotational frequency which is sequentially renewed by calculation and the actual rotational frequency. Accordingly, if the temperature prediction value for the disk motor 4 is obtained by simply considering that the destination rotational frequency this time is equal to the start rotational frequency of the next time, the prediction precision becomes extremely low. In this embodiment, however, the comparison portion 48 calculates the powered time of the disk motor 4, and the start angular velocity calculation portion 46 calculates the start angular velocity of the disk using the powered time. With this construction, the temperature prediction value for the disk motor 4 can be calculated with high precision even when seek operation is frequently repeated in jitter-free reproduction.

(2) A temperature prediction value having high correlation with the warp angle of the optical disk 2 can be obtained, and thus the warp angle can be suppressed to a threshold value or less with high precision. It has been found, as described above, that warping of the optical disk 2 is caused by, not the temperature of the optical disk 2 as a whole, but the temperature difference between portions of the optical disk 2, in particular, the temperature difference between the inner and outer circumferences of the optical disk 2. Since the temperature prediction value T calculated by the temperature calculation section 42 represents the temperature difference between the inner and outer circumferences of the optical disk 2, the temperature prediction value T and the warp angle of the optical disk 2 have high correlation with each other. Thus, by previously obtaining the threshold value $T_{th}$ as a temperature corresponding to an allowable limit value of the warp angle of the optical disk 2 experimentally and pre-storing the threshold value in the ROM, the temperature prediction value T can be suppressed to the threshold value $T_{th}$ or less and thereby the warp angle of the optical disk 2 can be suppressed to an allowable limit value or less.

(3) The optical disk device of this embodiment can be easily adapted to different disk rotation methods and rotational frequencies. In an optical disk device directed to recording and/or reproduction for a plurality of types of optical disks or in an optical disk device in which the disk rotational frequency is selected from a plurality of preset rotational frequencies, the heat value of the disk motor 4 during a seek varies depending on the rotation method or the rotational frequency of the optical disk. This tends to complicate the temperature prediction and reduce the precision of the temperature prediction. In this embodiment, however, the disk identification section 50 identifies the type of the disk, and, depending on the identification result, the disk rotation setting section 43 prohibits or permits the operation of the temperature calculation section 42 and the seek control section 51, and the temperature calculation section 42 predicts the temperature using the corresponding disk linear velocity v. Accordingly, highly practical control is possible for different disk rotation methods and disk rotational frequencies.

In this embodiment, the destination position calculation sub-section 16 calculates the destination position $r_d(n)$ of the optical head 5 based on destination address information provided with a seek instruction by the host device 23, and the destination angular velocity calculation portion 45 calculates the destination angular velocity $\omega_d(n)$ at the destination position $r_d(n)$ using the destination position $r_d(n)$ and the disk linear velocity v. Alternatively, the destination angular velocity calculation portion 45 may directly calculate the destination angular velocity $\omega_d(n)$ based on destination address information supplied from the host device 23. Also, any information other than the destination address information, such as a destination zone, may be input into the temperature calculation section 42 as long as such information represents the destination position.

The disk identification section 50 may identify the diameter of the optical disk 2 so that the constant C used in the temperature calculation section 42 can be changed depending on the inertia moment of the type of the optical disk. In this case, it is ensured that optical disks with different diameters can be prevented from warping.

It should be understood that the control described in Embodiment 2 can be combined with the control described in Embodiment 1.

In this embodiment, the temperature prediction value T represents the temperature difference between the inner and outer circumferences of the optical disk 2. Alternatively, as shown in FIG. 2, a first temperature measurement element 21 and a second temperature measurement element 22, such as thermistors, may be placed near the inner and outer circumferences of the optical disk 2, respectively. The outputs from the first and second temperature measurement elements 21 and 22 are input into the temperature calculation section 42. The temperature calculation section 42 calculates the difference between the outputs from the first and second temperature measurement elements 21 and 22, i.e., the temperature difference between the inner and outer circumferences of the optical disk 2. In correspondence with the temperature difference, the interval time during which an seek instruction is not executed is set. In this case, also, the advantageous effect of preventing warping of the optical disk 2 is realized.

The second temperature measurement element 22 is not necessarily placed near the outer circumference of the optical disk 2, but may be placed at any position which is apart from the inner circumference of the optical disk 2.

(Embodiment 3)

Figure 3:
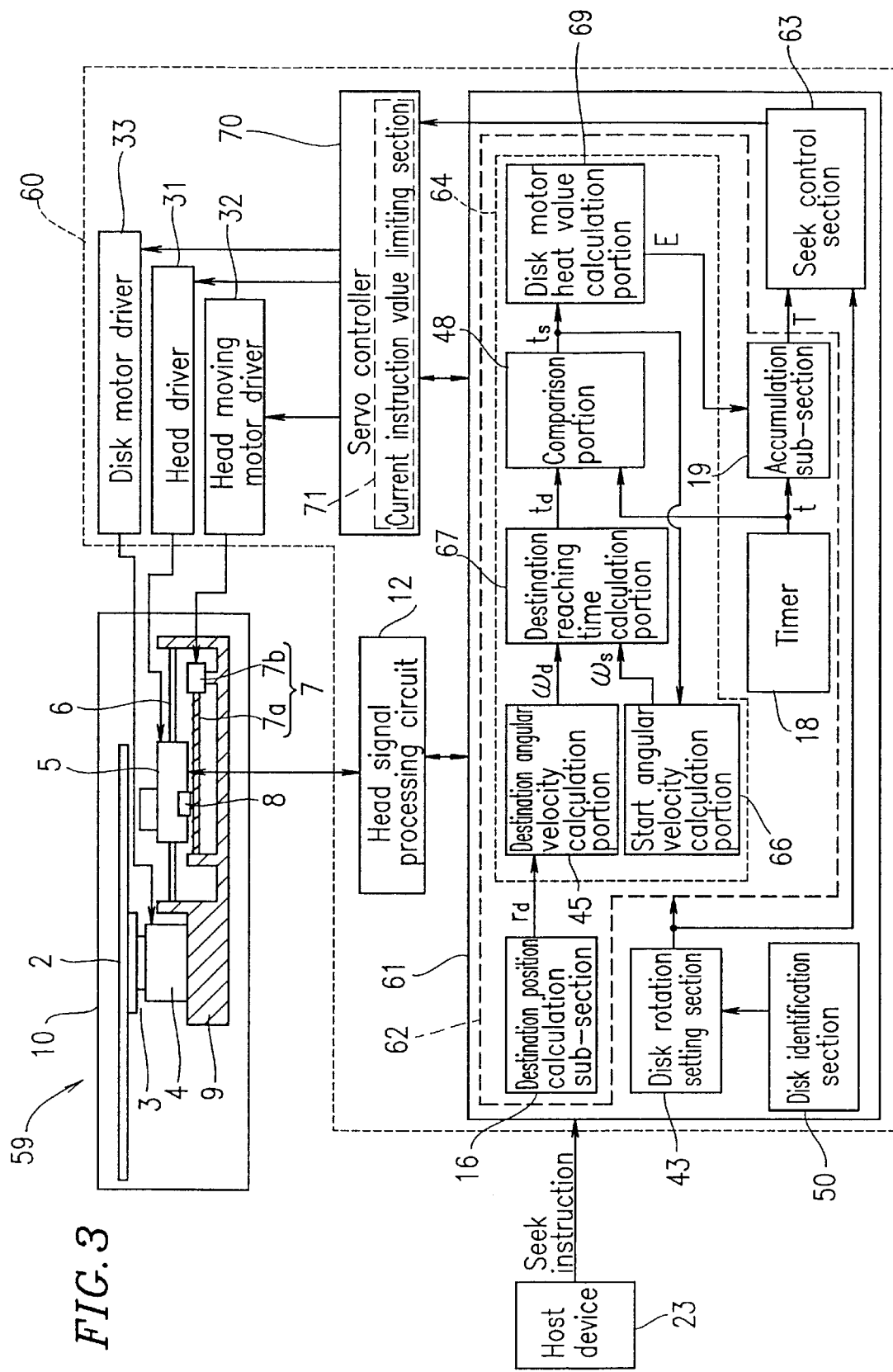
FIG. 3 is a block diagram schematically illustrating an optical disk device of Embodiment 3 according to the present invention.

FIG. 3 schematically illustrates an optical disk device 59 of Embodiment 3 according to the present invention. The internal temperature of the optical disk device 59 rises due to heat generated by the disk motor 4 when seek operation is continuously repeated a plurality of times. In Embodiment 3, such temperature rise is suppressed by temporarily reducing the driving current applied to the disk motor 4.

Referring to FIG. 3, the turntable 3, the disk motor 4, the optical head 5, the guide shaft 6, the head moving motor 7, the rack 8, the chassis 9, the case 10, the head signal processing circuit 12, the destination position calculation sub-section 16, the timer 18, the accumulation sub-section 19, the head driver 31, the head moving motor driver 32, and the disk motor driver 33, the disk rotation setting section 43, the destination angular velocity calculation portion 45, the comparison portion 48, and the disk identification section 50 are the same as those in Embodiment 2.

The optical disk device 59 receives the optical disk 2, which may be a read-only optical disk such as a CD or a DVD-ROM, or a rewritable optical disk such as a PD or a DVD-RAM, by means of a loading mechanism (not shown), and upon identifying the type of the optical disk 2, records/reproduces information on and/or from the optical disk 2.

A circuit part 60 includes the head signal processing circuit 12, the head driver 31, the head moving motor driver 32, the disk motor driver 33, an upper-level controller 61, and a servo controller 70.

The upper-level controller 61 includes a CPU, a DSP, RAM, ROM, and the like although these are not shown in FIG. 3, and controls the device based on programs and data pre-stored in the ROM. For example, the upper-level controller 61 exchanges commands with and transfers data to the host device 23 via an external interface (not shown), and controls various components in the optical disk device 59 including the head signal processing circuit 12 and the servo controller 70. The upper-level controller 61 includes the disk rotation setting section 43, the disk identification section 50, a temperature calculation section 62, and a seek control section 63.

The temperature calculation section 62 includes the destination position calculation sub-section 16, the timer 18, the accumulation sub-section 19, and a heat value calculation sub-section 64. As in Embodiment 2, the temperature calculation section 62 operates only when the disk rotation setting section 43 permits the operation thereof, to output the temperature prediction value T(n) every time the upper-level controller 61 executes a seek instruction by the host device 23. The temperature prediction value T(n) represents the temperature difference between the inner and outer circumferences of the optical disk 2 caused by heating of the disk motor 2.

The seek control section 63 compares the temperature prediction value T(n) with the threshold value $T_{th}$, pre-stored in the ROM every time a seek instruction by the host device 23 is executed, and outputs flag 0 to the servo controller 70 if the temperature prediction value T(n) is equal to or less than the predetermined value $T_{th}$, or outputs flag 1 to the servo controller 70 if the temperature prediction value T(n) exceeds the predetermined value $T_{th}$.

The heat value calculation sub-section 64 includes the destination angular velocity calculation portion 45, the comparison portion 48, a start angular velocity calculation portion 66, a destination reaching time calculation portion 67, and a disk motor heat value calculation portion 69.

The start angular velocity calculation portion 66 calculates the start angular velocity $\omega_s(n)$ at the n-th temperature prediction. The start angular velocity $\omega_s(n)$ is calculated according to expression (11) if the temperature prediction value T(n) is equal to or less than the threshold value $T_{th}$, or calculated according to expression (17) below if the temperature prediction value T(n) exceeds the threshold value $T_{th}$.

$$\omega_s(n)=\omega_s(n-1)+C' \cdot t_s(n-1) \qquad (17)$$

Expression (17) is obtained by replacing the constant C in expression (11) with a constant C'. The reason for this replacement is as follows. If $T(n)>T_{th}$, the driving current applied to the disk motor 4 is limited to reduce motor torque as will be described herein after. Therefore, different angular velocity prediction operations are performed for the state where the driving current is not limited and the state where the driving current is limited. The constant C' is a positive constant predetermined from a torque generated in the disk motor 4 and the inertia moment of the optical disk 2 in the state where the driving current is limited. The constant C' is smaller than the constant C in expression (11). The constant C' is obtained experimentally and pre-stored in the ROM.

The destination reaching time calculation portion 67 calculates the powered time $t_d(n)$ required for the optical disk 2 to reach the destination angular velocity $\omega_d(n)$ based on the destination angular velocity $\omega_d(n)$ and the start angular velocity $\omega_s(n)$. Again, in this case, if $T(n)>T_{th}$, the driving current applied to the disk motor 4 is limited to reduce motor torque as will be described hereinafter. Accordingly, the destination reaching time $t_d(n)$ is calculated according to expression (12) if the temperature prediction value T(n) is equal to or less than the threshold value $T_{th}$, or calculated according to expression (18) below if the temperature prediction value T(n) exceeds the threshold value $T_{th}$.

$$t_d(n)=\{\omega_d(n)-\omega_s(n)\}/C' \qquad (18)$$

Expression (18) is obtained by replacing the constant C in expression (12) with the constant C' described above.

The disk motor heat value calculation portion 69 calculates the heat value E(n) by multiplying a constant representing consumed power of the disk motor 4 by the powered time $t_s(n)$. In this case, also, if $T(n)>T_{th}$, the driving current applied to the disk motor 4 is limited to reduce a motor torque as will be described hereinafter. Accordingly, the temperature prediction value T(n) is compared with the threshold value $T_{th}$, and the heat value E(n) is calculated according to expression (13) if the temperature prediction value T(n) is equal to or less than the threshold value $T_{th}$, or calculated according to expression (19) below if the temperature prediction value T(n) exceeds the threshold value $T_{th}$.

$$E(n)=W' \cdot t_s(n) \qquad (19)$$

The constant W' is smaller than the constant W in expression (13) and determined so as to satisfy expression (20) below. The constant W' is pre-stored in the ROM.

$$W' \leq T_{th}/(\tau \cdot k) \qquad (20)$$

The servo controller 70 controls the head driver 31, the head moving motor driver 32, and the disk motor driver 33 based on a servo signal output from the head signal processing circuit 12 and an instruction from the upper-level controller 61. The servo controller 70 includes a digital signal processor (DSP) and the like. If the disk motor 4 is controlled in the ZCLV rotation method, the servo controller 70 generates a current instruction value to the disk motor driver 33 based on an FG signal (a rotational frequency detection signal) and a destination rotational frequency, so that the disk motor 4 rotates at the destination rotational frequency.

The servo controller 70 includes a current instruction value limiting section 71. The current instruction value limiting section 71 is programmed so that the operation thereof is changed depending on the flag output from the seek control section 63. If the flag output from the seek control section 63 is 0 (indicating that the temperature prediction value T(n) is equal to or less than the threshold value $T_{th}$), the current instruction value generated by the servo controller 70 is output without any limitation. If the flag output from the seek control section 63 is 1 (indicating that the temperature prediction value T(n) exceeds the threshold value $T_{th}$), the current instruction value generated by the servo controller 70 is output after being limited to a predetermined limit value $X_{lim}$ or less. The limit value $X_{lim}$ is pre-stored in the ROM. The output of the current instruction value limiting section 71 (i.e., the current instruction value or the limit value $X_{lim}$) is supplied to the disk motor driver 33 after being D/A converted, so that the driving current corresponding to the output is applied to the disk motor 4.

Figure 4:
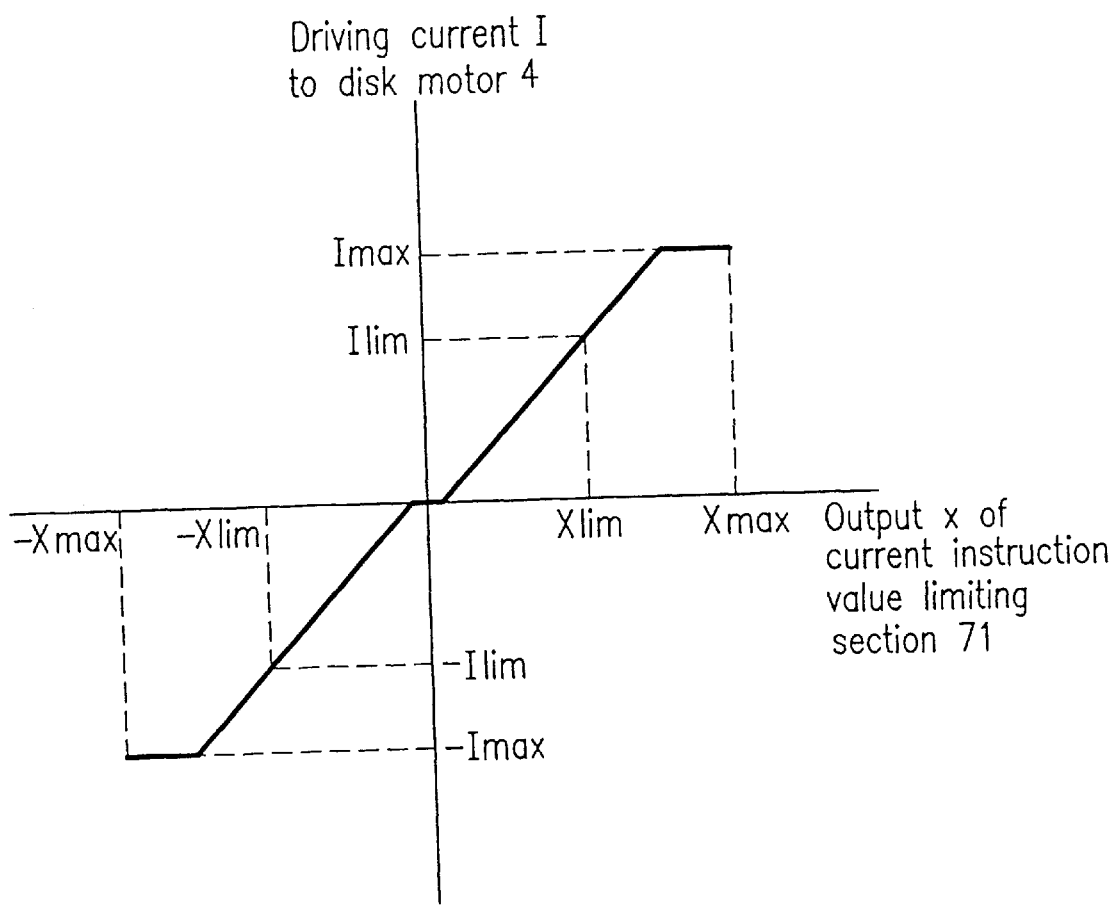
FIG. 4 is a graph showing the relationship between the output of a current instruction value limiting section and the driving current applied to a disk motor in Embodiment 3.
Figure 5:
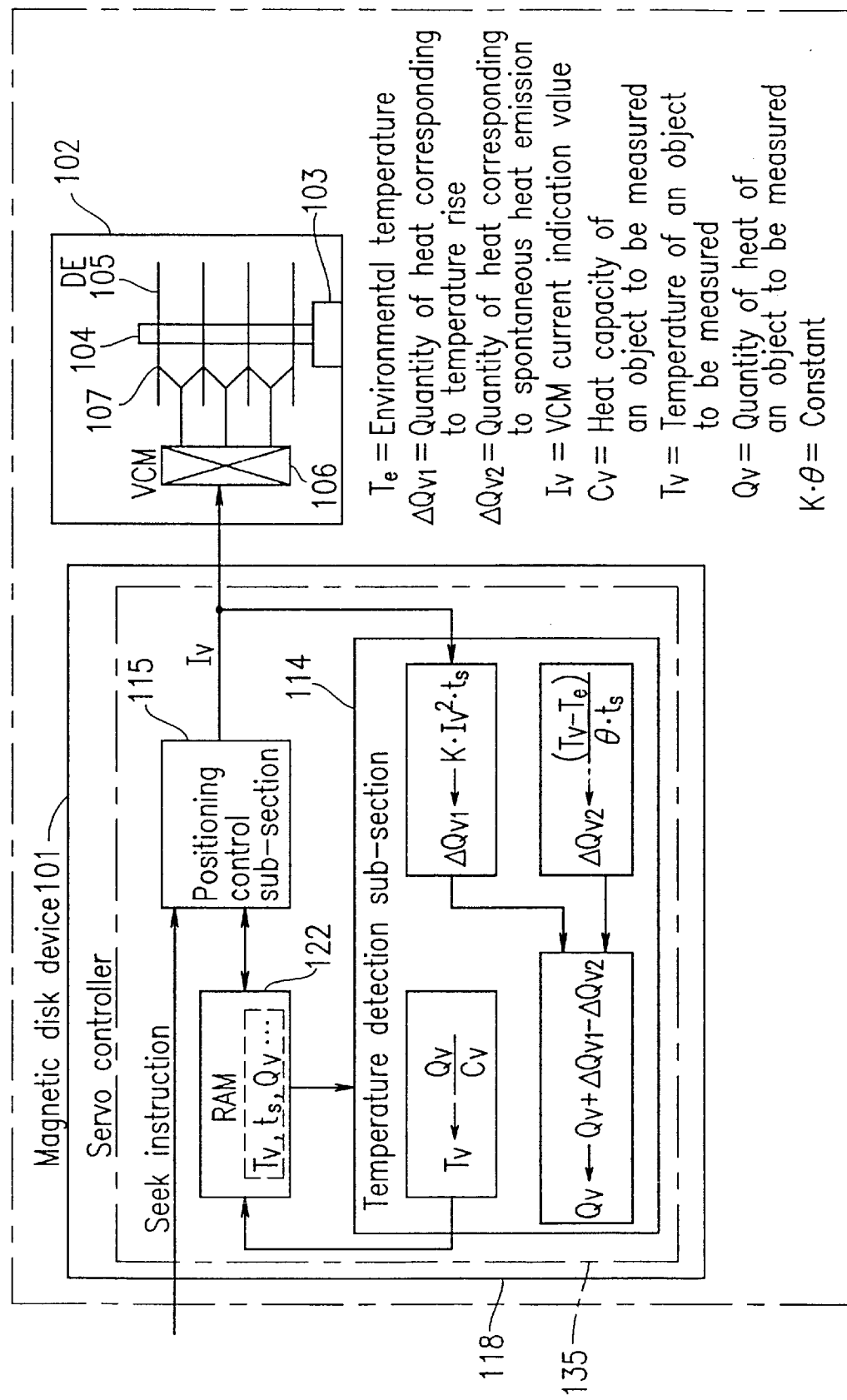
FIG. 5 is a block diagram schematically illustrating an exemplified conventional disk device.

FIG. 4 is a graph showing the relationship between the output of the current instruction value limiting section 71 and the driving current applied to the disk motor 4. The X-axis of the graph of FIG. 4 represents the output X of the current instruction value limiting section 71, and the Y-axis thereof represents the driving current I applied to the disk motor 4. The output X is composed of eight bits indicating a value in the range of −127 to 127. The output X and the driving current I is substantially proportional to each other, although a dead zone where I=0 exists around the point of X=0 and the driving current I becomes saturated values ($\pm I_{max}$) near the points where the output X is maximum and minimum ($\pm I_{max}$). The sign of the driving current I indicates the direction of the current: If I<0, the motor is powered so that it is accelerated; and if I>0, the motor is powered so that it is decelerated.

The current instruction value limiting section 71 outputs the current instruction value generated by the servo controller 70 if the temperature prediction value T(n) is equal to or less than the threshold value $T_{th}$ as described above. Accordingly, a current instruction value in the range of $-X_{max}$ to $X_{max}$ is output, and a driving current in the range of $-I_{max}$ to $I_{max}$ corresponding to the current instruction value is applied to the disk motor 4. In the subsequent description, when the magnitudes of values are compared, it means that the absolutes of these values are compared, not considering the signs indicating directions.

If the temperature prediction value T(n) exceeds the threshold value $T_{th}$, the current instruction value limiting section 71 limits the current instruction value to the limit value $X_{lim}$ or less as described above. Since the limit value $X_{lim}$ is smaller than the maximum current instruction value $X_{max}$, a driving current $I_{lim}$ which is smaller than the maximum driving current, $I_{max}$ is generated for the limit value $X_{lim}$. More specifically, if the current instruction value generated by the servo controller 70 is larger than the limit value $X_{lim}$, the limit value $X_{lim}$ is output from the current instruction value limiting section 71 and thus the driving current $I_{lim}$ is applied to the disk motor 4. On the contrary, if the current instruction value generated by the servo controller 70 is smaller than the limit value $X_{lim}$, the current instruction value is output from the current instruction value limiting section 71 without any limitation and the driving current in the range of $-I_{lim}$ to $I_{lim}$ is applied to the disk motor 4.

As a result, if $T(n)>T_{th}$, the driving current applied to the disk motor 4 is limited to the limit value $I_{lim}$. The limit value $I_{lim}$ is experimentally determined so that the consumed power W' of the disk motor 4 is identical to a value set according to expression (20). In such a state where the driving current of the disk motor 4 is limited, it is possible to suppress the temperature prediction value T(n) to the threshold value $T_{th}$ or less even if seeks are continuously performed.

The consumed power W' arises from some causes such as heating due to coil resistance of the disk motor 4 and mechanical loss of the disk motor 4. Since most of the loss during a seek is caused by heating due to coil resistance, the relationship in expression (21) below is approximately established.

$$W'=R \cdot I_{lim}^2 \qquad (21)$$

wherein R denotes the coil resistance value.

Referring back to FIG. 3, the operation of the optical disk device with the above configuration will be described, assuming that the optical disk 2 is a DVD-RAM, for example.

If the temperature prediction value T(n) is equal to or less than $T_{th}$, the upper-level controller 61 performs substantially the same operations as those of the upper-level controller 41 in Embodiment 2, including operations from the determination of whether or not the optical disk 2 exists until the calculation of the temperature prediction value T(n) by the temperature calculation section 62. The temperature calculation section 62 calculates the n-th temperature prediction value T(n) in the following manner when the (n+1)th seek instruction is issued by the host device 23.

First, the destination position calculation sub-section 16 calculates the destination position $r_d(n)$ based on destination address information for the n-th seek, and the destination angular velocity calculation portion 45 calculates the destination angular velocity $\omega_d(n)$ of the disk according to expression (10). The destination reaching time calculation portion 67 calculates the powered time $t_d(n)$ required to reach the destination angular velocity $\omega_d(n)$ according to expression (12) based on the destination angular velocity $\omega_d(n)$ and the start angular velocity $\omega_s(n)$. The timer 18 outputs the lapse time t(n) counted from the time of issuance of the n-th seek instruction. The comparison portion 48 compares the destination reaching time $t_d(n)$ with the lapse time t(n) to calculate the powered time $t_s(n)$ during which power has been actually supplied to the disk motor 4.

The disk motor heat value calculation portion 69 calculates the heat value E(n) according to expression (13) based on the powered time $t_s(n)$. The accumulation sub-section 19 outputs the temperature prediction value T(n) according to expression (9) based on the heat value E(n).

If the seek control section 63 determines that the temperature prediction value T(n) is equal to or less than the threshold value $T_{th}$, flag 0 is output to the servo controller 70. The start angular velocity calculation portion 66 calculates the next start angular velocity $\omega_s(n+1)$ according to expression (11) based on the powered time $t_s(n)$. Upon receipt of flag 0 from the seek control section 63, the servo controller 70 inactivates the current instruction value limiting section 71. As a result, a driving current having the maximum value $I_{max}$ is applied to the disk motor 4 from the disk motor driver 33.

If the temperature prediction value T(n) exceeds the threshold value $T_{th}$, the seek control section 63 outputs flag 1 indicating that the temperature prediction value T(n) exceeds the threshold value $T_{th}$, to the servo controller 70. The servo controller 70 activates the current instruction value limiting section 71, so that the current instruction value is limited to the limit value $X_{lim}$ or less and thus the driving current applied to the disk motor 4 from the disk motor driver 33 is limited to $I_{lim}$ or less.

The Upper-level controller 61 replaces the constants C and W used in the start angular velocity calculation portion 66, the destination reaching time calculation portion 67, and the disk motor heat value calculation portion 69 with the constants C' and W', respectively.

When the (n+2)th seek instruction is issued and the (n+1)th temperature prediction value. T(n+1) is to be calculated, the destination position calculation sub-section 16 calculates the destination position $r_d(n+1)$ from destination address information for the (n+1)th seek, and the destination angular velocity calculation portion 45 calculates the destination angular velocity $\omega_d(n+1)$ of the disk according to expression (10). The start angular velocity calculation portion 66 calculates the next start angular velocity $\omega_s(n+1)$ according to expression (17) based on the powered time $t_s(n)$. The destination reaching time calculation portion 67 calculates the destination reaching time $t_d(n+1)$ according to expression (18) based on the destination angular velocity $\omega_d(n+1)$ and the start angular velocity $\omega_s(n+1)$. The timer 18 outputs the lapse time t(n+1) counted from the time of issuance of the (n+1)th seek instruction. The comparison portion 48 compares the destination reaching time $t_d(n+1)$ with the lapse time t(n+1) to calculate the powered time to(n+1) during which power has been actually supplied to the disk motor 4, The disk motor heat value calculation portion 69 calculates the heat value E(n+1) according to expression (19) based on the powered time $t_s(n+1)$. The accumulation sub-section 19 outputs the temperature prediction value T(n+1) obtained according to expression (9) based on the heat value E(n+1).

As described above, every time a seek instruction is issued by the host device 23, the temperature calculation section 62 calculates the temperature prediction value T(n), and the seek control section 63 compares the value with the threshold value $T_{th}$. If the temperature prediction value T(n) exceeds the threshold value $T_{th}$, the current instruction value limiting section 71 is activated to limit the driving current applied to the disk motor 4, and the constants C' and W' are set to be used in the temperature calculation section 62. If the temperature prediction value T(n) is equal to or less than the threshold value $T_{th}$, the current instruction value limiting section 71 is inactivated so that no limitation is set to the driving current applied to the disk motor 4, and the constants C and W are set to be used in the temperature calculation section 62.

In Embodiment 3, in addition to the effects described in relation with Embodiment 2, the following effects are obtained.

(1) An increase in an average seek time in the optical disk device performing seek control can be minimized. This effect on the average seek time will be described by comparing this embodiment in which the motor driving current is reduced with Embodiment 2 in which the interval time is inserted, assuming that the heat value of the motor is the same in the two embodiments.

In the method in Embodiment 2 in which the interval time is inserted, if the average heat value of a motor is attempted to be halved, for example, an interval time having substantially the same length as the driving time needs to be inserted. This doubles the average seek time.

In the method in this embodiment in which the driving current is reduced, the average heat value of a motor can be halved by reducing the driving current to 0.71 times (i.e., square root of ½ times) the original value. The average seek time is inversely proportional to motor torque, and the motor torque is proportional to the driving current. Accordingly, the increase in the average seek time can be suppressed to about 1.4 times. Thus, the increase in the average seek time can be minimized.

(2) In a disk device supporting jitter-free reproduction, the effect of suppressing the increase in the average seek time is especially prominent. In general, in jitter-free reproduction, it is possible to read information before the rotational frequency reaches a destination rotational frequency and shift to a next seek.

However, in the method in Embodiment 2 of inserting an interval time, the interval time is inserted only after the destination rotational frequency is reached and the driving current applied to the disk motor 4 is sufficiently reduced. Therefore, the jitter-free reproduction is substantially ineffective when the interval time is actually inserted. This results in especially increasing the average seek time when the interval time is inserted.

On the contrary, in the method in this embodiment of reducing the motor driving current, since the heat value per unit time itself is reduced, no insertion of an interval time is required, and thus jitter-tree reproduction can easily be supported. Therefore, in this embodiment, an increase in the average seek time can be suppressed especially prominently for a disk device employing jitter-free reproduction.

In this embodiment, a change in the characteristics of the disk motor 4 observed when the driving current is limited is compensated only by replacing the constants C and W used by the temperature calculation section 62 with the constants C' and W', which are smaller than the constants C and W, as the driving current applied to the disk motor 4 is reduced. This makes it possible to perform high-precision temperature prediction.

In this embodiment, the current instruction value limiting section 71 limits the driving current applied to the disk motor 4. Likewise, a driving current applied to the head moving motor 7 can also be limited by limiting a current instruction value to the head moving motor driver 32.

It should be understood that the control described in Embodiment 3 can be combined with the control described in Embodiment 1.

Thus, in the disk device according to the present invention, the temperature prediction value is calculated using the destination position of the head only when a seek instruction is issued. Accordingly, the temperature prediction value can be calculated with high precision simply by performing arithmetic operation at a low frequency which is the same as the frequency of issuance of the seek instruction. This eminently reduces the burden on the device required for temperature prediction.

In the disk device according to the present invention, the warp angle of a disk can be predicted with high precision based on the temperature difference between portions of the disk, and the operation of the disk driving section or the head moving section is controlled depending on the output of the temperature calculation section. This effectively suppresses warping of the disk and improves reliability during the recording and/or reproduction by the head.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A disk device comprising:
    a disk driving section for rotating a disk;
    a head for recording and/or reproducing information on and/or from the disk;
    a head moving section for moving the head from a start position to a destination position;
    a temperature calculation section for calculating a temperature change at a predetermined position, wherein the calculation is carried out based on the information of the start position and the destination position; and
    a control section for controlling the disk driving section and/or the head moving section depending on the temperature change calculated by the temperature calculation section.

2. A disk device according to claim 1, wherein the temperature calculation section includes a timer, a heat value calculation sub-section, and an accumulation sub-section, wherein
    the timer clocks lapse time from a point when the preceding temperature change has been calculated,
    the heat value calculation sub-section calculates a heat value of the disk driving section and/or the head moving section generated with the movement of the head from the start position to the destination position, and
    the accumulation sub-section calculates the temperature change based on the preceding temperature change, the lapse time, and the heat value and renews the temperature change.

3. A disk device according to claim 2, wherein the timer clocks a lapse time t defined as from a point when an (n−1)th temperature change has been calculated until a point when an n-th temperature change is calculated, wherein
    the heat value calculation sub-section calculates a heat value E as the heat value generated during the lapse time t, and
    the accumulation sub-section calculates the n-th temperature change based on the (n−1)th temperature change, the lapse, time t and the heat value E.

4. A disk device according to claim 3, wherein the n-th temperature change is represented by expression (1) below or an approximate expression of expression (1):

$$T(n)=\exp\{-t/\tau\}\cdot T(n-1)+k\cdot E \tag{1}$$

where T(n) denotes the n-th temperature change, T(n−1) denotes the (n−1)th temperature change, τ denotes a time constant, and k denotes a coefficient.

5. A disk device according to claim 3, wherein the n-th temperature change is represented by expression (2) below:

$$T(n)=[1-\{t/\tau\}]\cdot T(n-1)+k\cdot E \tag{2}$$

where T(n) denotes the n-th temperature change, T(n−1) denotes the (n−1)th temperature change, τ denotes a time constant, and k denotes a coefficient.

6. A disk device according to claim 2, wherein the heat value calculation sub-section calculates a moving distance of the head from the start position to the destination position and then calculates the heat value based on a function having the moving distance of the head as a variable.

7. A disk device according to claim 2, wherein the heat value calculation sub-section calculates the heat value based on a function having, as a variable, a change in an angular velocity of the disk in a time period during which the head moves from the start position to the destination position.

8. A disk device according to claim 2, wherein the disk driving section shifts an angular velocity of the disk to a destination angular velocity as the head moves from the start position toward the destination position, wherein when the head starts to move to a next destination position before the angular velocity of the disk has not reached the destination angular velocity, the heat value of the disk driving section and/or the head moving section is calculated based on a function having the lapse time clocked by the timer as a variable.

9. A disk device according to claim 2, wherein the heat value calculation sub-section includes:

a start angular velocity calculation portion for calculating a start angular velocity of the disk obtained when the head is located at the start position;

a destination angular velocity calculation portion for calculating the destination angular velocity of the disk obtained when the head is located at the destination position;

a reaching time calculation portion for calculating a reaching time required for the angular velocity of the disk to reach the destination angular velocity by being driven by the disk driving section, wherein the calculation is carried out based on the start angular velocity calculated by the start angular velocity calculation portion and the destination angular velocity calculated by the destination angular velocity calculation portion;

wherein a comparison portion for selecting a shorter time between the reaching time calculated by the reaching time calculation portion and the lapse time clocked by the timer, and the heat value of the disk driving section and/or the head moving section is calculated based on a function having the shorter time selected by the comparison portion as a variable.

10. A disk device according to claim 9, wherein the start angular velocity calculation portion calculates the start angular velocity based on expression (3) below or an approximate expression of expression (3):

$$\omega_s(n)=\omega_s(n-1)+C \cdot t_s \qquad (3)$$

where $\omega_s(n)$ denotes the start angular velocity at the point when the n-th temperature change is calculated, $\omega_s(n-1)$ denotes the start angular velocity at the point when the (n−1)th temperature change has been calculated, $t_s$ denotes the shorter value selected by the comparison portion, and C denotes a constant.

11. A disk device according to claim 9, wherein the heat value calculation portion calculates heat value of the disk driving section and/or the head moving section based on expression (4) below:

$$E=W \cdot t_s \qquad (4)$$

where E denotes the heat value, $t_s$ denotes the shorter time selected by the comparison portion, and W denotes a constant.

12. A disk device according to claim 1, wherein the temperature calculation section calculates the temperature change every time a head moving instruction for moving the head to a new destination position is issued.

13. A disk device according to claim 1, wherein the destination position in a head moving operation is set as a start position for the next head moving operation.

14. A disk device according to claim 1, wherein the control section sets an interval time $t_i$ for driving the disk driving section and/or the head moving section intermittently when the temperature change calculated by the temperature calculation section exceeds a predetermined threshold.

15. A disk device according to claim 14, wherein the interval time $t_i$ is calculated based on expression (5) below:

$$ti=\tau \cdot k \cdot E/Th \qquad (5)$$

where τ, k, and Th denote constants, and E denotes the heat value of the disk driving section and/or the head moving section.

16. A disk device according to claim 1, wherein the control section reduces the driving current applied to the disk driving section and/or the head moving section when the temperature change calculated by the temperature calculation section exceeds a predetermined threshold.

17. A disk device according to claim 16, wherein the control section includes a servo controller and a current instruction value limiting section, the servo controller generates a current instruction value for specifying the driving current applied to the disk driving section and/or the head moving section, and the current instruction value limiting section limits the current instruction value to a predetermined range when the temperature change calculated by the temperature calculation section exceeds the predetermined threshold.

18. A disk device according to claim 16, wherein a manner by which the temperature calculation section calculates the temperature change is changed as the driving current applied to the disk driving section and/or the head moving section is reduced.

19. A disk device according to claim 10, wherein the control section reduces the driving current applied to the disk driving section and/or the head moving section when the temperature change calculated by the temperature calculation section exceeds a predetermined threshold, and the temperature calculation section changes the constant C in expression (3) as the driving current applied to the disk driving section and/or the head moving section is reduced.

20. A disk device according to claim 11, wherein the control section reduces the driving current applied to the disk driving section and/or the head moving section when the temperature change calculated by the temperature calculation section exceeds a predetermined threshold, and the temperature calculation section changes the constant W in expression (4) as the driving current applied to the disk driving section and/or the head moving section is reduced.

21. A disk device according to claim 1, further comprising a disk identification section for identifying the type of a disk, wherein a manner by which the temperature calculation section calculates the temperature change, or a manner by which the control section controls the disk driving section and/or the head moving section is changed depending on the type of the disk identified by the disk identification section.

22. A disk device according to claim 21, wherein the disk device is configured so that the temperature calculation section and/or the control section operate or do not operate depending on the type of the disk identified by the disk identification section.

23. A disk device according to claim 1, further comprising a rotation setting section for setting a rotational frequency or a rotation linear velocity of the disk, wherein a manner by which the temperature calculation section calculates the temperature change, or a manner by which the control section controls the disk driving section and/or the head moving section is changed depending on the rotational frequency and/or the rotation linear velocity set by the rotation setting section.

24. A disk device according to claim 23, wherein the disk rotation setting section sets the rotational frequency or the rotation linear velocity of the disk depending on whether the disk driving section rotates the disk in accordance with a CAV method, a CLV method, or a ZCLV method.

25. A disk device according to claim 24, wherein when the disk driving section rotates the disk in accordance with the CAV method, the rotation setting section sets a fixed rotational frequency, and the operation of the temperature calculation section and/or the control section is prohibited.

26. A disk device according to claim 24, wherein, when the disk driving section rotates the disk in accordance with the ZCLV method and seeks are performed with a same zone, the rotation setting section sets a fixed rotational frequency, and the operation of the temperature calculation section and/or the control section is prohibited, and when the seeks extend to a different zone, the rotational frequency is changed by the rotation setting section, and the operation of the temperature calculation section and/or the control section is permitted.

27. A disk device according to claim 1, wherein the temperature calculation section calculates a temperature difference between portions of the disk.

28. A disk device comprising:

a disk driving section for rotating a disk;

a head for recording and/or reproducing information on and/or from the disk;

a head moving section for moving the head from a start position to a destination position;

a temperature calculation section for calculating a temperature difference between portions of the disk; and a control section for controlling the disk driving section and/or the head moving section depending on the temperature difference calculated by the temperature calculation section.

29. A disk device according to claim 28, wherein the control section reduces a driving current applied to the disk driving section when the temperature difference calculated by the temperature calculation section exceeds a predetermined threshold.

30. A disk device according to claim 28, wherein the temperature calculation section includes a first temperature measurement element for detecting a temperature near an inner circumference of the disk and a second temperature measurement element for detecting a temperature near an outer circumference of the disk, and calculates a difference between the temperatures detected by the first and second temperature measurement elements.

* * * * *